US005110239A

United States Patent [19]

Riley et al.

[11] Patent Number: 5,110,239

[45] Date of Patent: May 5, 1992

[54] VACUUM CLAMPING SYSTEM

[75] Inventors: A. Douglass Riley; Hugh W. Hanson, both of Winnipeg, Canada

[73] Assignee: The Boeing Company, Seattle, Wash.

[21] Appl. No.: 691,998

[22] Filed: Apr. 26, 1991

[51] Int. Cl.[5] .......... B23D 1/30; B27C 5/00; B25B 11/00

[52] U.S. Cl. .......... 409/125; 144/2 R; 144/144 R; 144/372; 269/21; 294/64.1; 409/130

[58] Field of Search .......... 294/64.1; 409/125, 130; 269/21, 293; 144/2 R, 144 R, 144.5, 371, 372

[56] References Cited

U.S. PATENT DOCUMENTS

| | | | |
|---|---|---|---|
| 4,026,591 | 5/1977 | Cleaveland | 294/1.2 |
| 4,351,518 | 9/1982 | Stievenart | 271/90 |
| 4,557,514 | 12/1985 | Cushman et al. | 294/64.1 |
| 4,558,755 | 12/1985 | Lundin | 177/147 |
| 4,564,188 | 1/1986 | McNair | 271/103 |
| 5,035,409 | 7/1991 | Mullinere | 269/21 |

FOREIGN PATENT DOCUMENTS

| | | |
|---|---|---|
| 89/040414 | 2/1989 | European Pat. Off. . |
| 1109152 | 4/1968 | United Kingdom . |

*Primary Examiner*—W. Donald Bray
*Attorney, Agent, or Firm*—Bruce A. Kaser

[57] ABSTRACT

A vacuum clamping system for trimming a flat or gently curved part from a sheet of material includes a template and a plurality of hold-down members, or pods, that sandwich the template between the pods and the workpiece. The template has a plurality of circular openings through its thickness. Each pod has an expandable bellows with an open suction end that extends downwardly through one of such openings, and comes into contact with and is closed by the workpiece. Subsequent evacuation of the bellows causes it to contract, thus pulling the workpiece tightly against one side of the template, and further pulling a clamping portion of the pod tightly down against the template's other side. This fixes the template in position between the pod and workpiece. Preferably, a number of pods are used in combinatiton with any given template to improve the clamping action.

12 Claims, 3 Drawing Sheets

VACUUM CLAMPING SYSTEM

TECHNICAL FIELD

The invention disclosed here generally relates to the manufacture of flat and gently curving parts from sheet-like or molded workpieces, where a given workpiece is trimmed or routed in order to create the shape of the part. More particularly, the invention relates to the use of templates in a fixed position relative to a workpiece as it is being trimmed.

BACKGROUND ART

It is well-known to make flat parts from larger sheets of material by trimming the sheets to form the part's outline. This kind of operation occurs in many different manufacturing environments, ranging from residential construction, where sheets of plywood are routed to form the outline of windows and doors, to the aircraft industry where sheets of aluminum, or in some cases, composite materials, are routed to form flat stock that is later used as an aircraft part.

The present invention was developed for the purpose of improving certain trimming/routing operations at a Canadian manufacturing facility owned by The Boeing Company in Winnipeg, Manitoba. There, many flat parts are made from relatively thin, molded sheets of composite material. Making the parts first involves placing a template across a given sheet, the template defining the part's outline or perimeter. This is followed by cutting or trimming around the sheet around the template to create the part.

Prior to the development of the present invention, it has been the practice at Boeing to clamp the template to the sheet by using conventional "C" clamps, so that the template cannot move relative to the sheet as its is subsequently trimmed. Trimming is typically done by a hand-held router whose cutting path is guided by the template's outer edge.

The use of "C" clamps to hold templates has always been troublesome in this particular manufacturing environment because of the large numbers of parts being made. The clamps interfere with routing, because the edge of the template is typically positioned inside the "C" of the clamp. Therefore, at one time or another, each clamp blocks router travel along the template's edge. As a result, each clamp must be removed when it gets in the way, temporarily stopping further routing, and later re-attached after the router has passed.

The present invention was designed to overcome the above-described clamp interference, and consequent slowing of trimming/routing that is caused thereby. As will become apparent, the invention provides a system for fixedly holding a template relative to a workpiece, but at the same time, leaves the template's outer edge free for routing around its perimeter without interference. Just how the invention accomplishes this will become understood upon consideration of the following.

SUMMARY OF THE INVENTION

The invention is a vacuum clamping system that is particularly well-suited for trimming sheets of material to make parts. A system in accordance with the invention includes a template that is normally laid flatly across one side of a sheet-like workpiece. The template is shaped to define the perimeter of a given part that is to be manufactured by trimming the workpiece. The template has a plurality of circular openings through its thickness, which extend al the way from one side surface that is placed in contact with the workpiece, to an opposite side surface that faces away from the workpiece. A plurality of vacuum-operated hold-down pods are mounted overhead relative to both the template and workpiece. These are operative to attach themselves to the workpiece through the template openings via suction, and to consequently clamp the template tightly between the pods and workpiece.

Each hold-down pod carries a bellows that is expandable and contractible, for respectively growing longer or becoming shorter. A vacuum source is connected to each bellows, for drawing air from inside each one, and thereby causing it to contract under certain conditions.

Each bellows has an open or "suction" end that is sized and shaped to pass through any one of the template openings. In operation, i.e. when the pod carrying the bellows is positioned over a template opening, such end is passed through one of the template openings, and comes into contact with, and is closed by, one side of the workpiece. This operation is performed while the bellows is in an expanded condition.

After such closing contact is made, the vacuum source is then activated, thus causing the bellows to contract and shorten. Each hold-down pod has a clamping housing, connected to its respective bellows, in a manner so that such housing is consequently pulled into thrusting contact against the template. As mentioned above, this action sandwiches the template between the workpiece and the pods, and holds the template in a fixed position for a subsequent trimming/routing operation. The template openings and pods are located sufficiently inwardly from the template's border, or outer perimeter, so that the pods will not interfere with a router's path of travel.

The housing of each pod is cylindrically shaped and hollow. The housing has an open end that provides an annularly-shaped thrusting surface for pressing against the template around any one of the template's openings. Such surface has a diameter that is larger than the diameter of any one of the openings extending through the template. The other end of the housing is closed.

At least a portion of the pod's bellows is nested or received within the housing, but the suction end of the bellows normally extends out of the housing past the annularly-shaped thrusting surface just described. The bellows is made of an airtight fabric such as, for example, rubberized canvas, and its outer walls has a ribbed, cylindrical shape that is defined by a helical spring.

The spring provides the bellows with flexible expansion and contraction capability along the spring's centerline axis. In other words, the bellows lengthens or shortens as the spring respectively extends or contracts. The bellows is more or less concentrically arranged within the housing, and that portion of the bellows which is near, or immediately adjacent its suction end, is concentrically surrounded by the housing's annularly-shaped thrusting surface.

The bellows is connected to the housing's closed end, on the inside of the housing, preferably by a resinous bonding material or filler. A vacuum orifice extends through the housing's closed end, and defines an airflow pathway from the vacuum source to inside the bellows, for enabling the above-described bellows contraction and clamping action. The bellows naturally expands upon removal of the vacuum because of the normal spring force provided by its helical spring.

The suction end of the bellows is defined by a circular ring that provides a circular opening leading into the bellows. An annular seal is connected to such ring, and presses against the workpiece during a clamping operation. It provides a substantially airtight seal between the bellows and workpiece. The annular seal may be made of a rubber material such as, for example, silicone or foam rubber.

The invention as summarized above is explained and described in further detail below, reference now being drawn to such description and the drawings which are appended to this disclosure.

BRIEF DESCRIPTION OF THE DRAWINGS

In the drawings, like reference numerals and letters refer to like parts throughout the various views, unless indicated otherwise, and wherein.

BEST MODE FOR CARRYING OUT THE INVENTION

Figure 1:
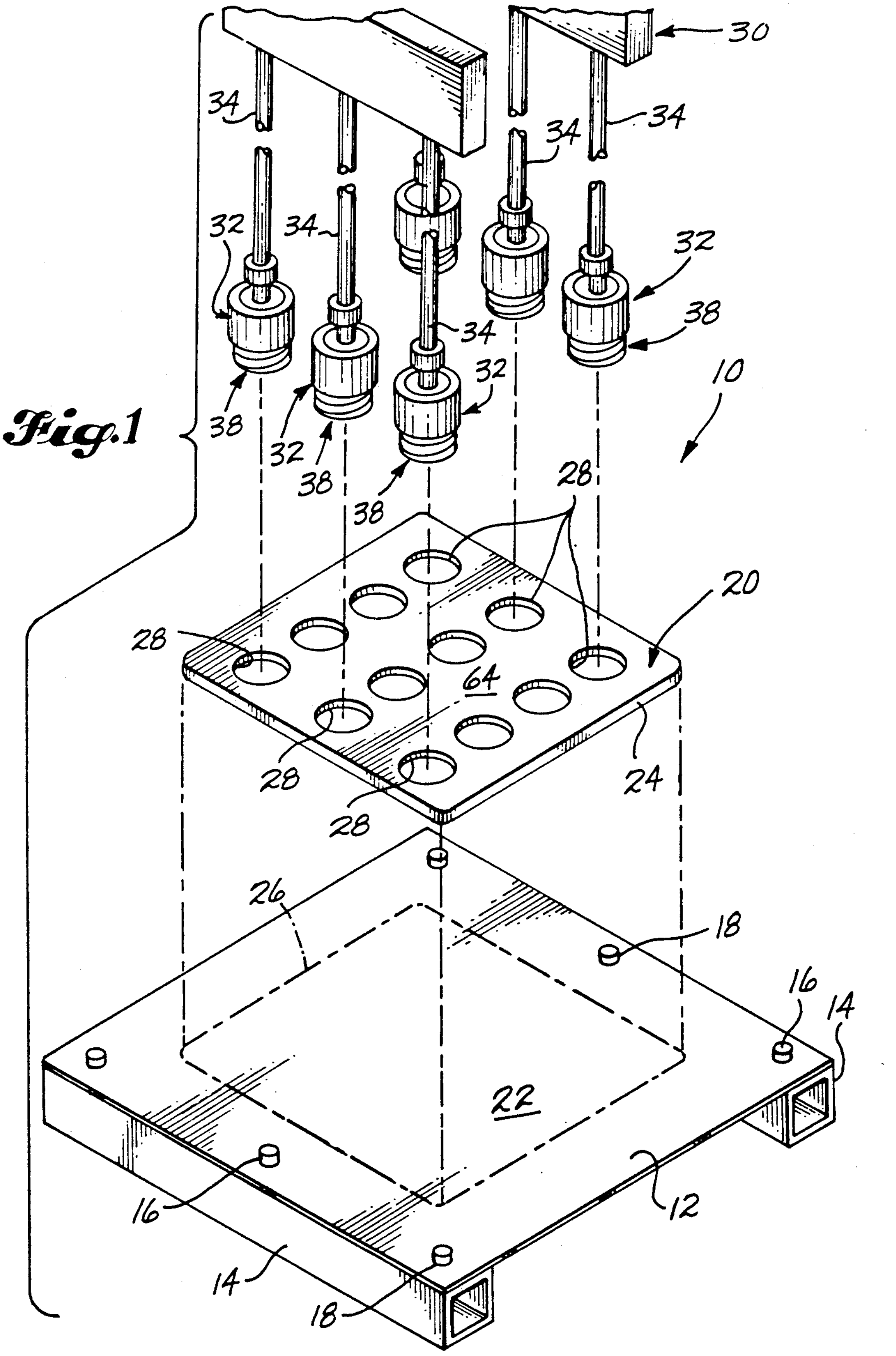
FIG. 1 is a pictorial view of a vacuum clamping system in accordance with the invention, and shows a template and a plurality of hold-down pods spaced above a workpiece that is to be trimmed.

Referring now to the drawings, and first to FIG. 1, therein is shown at 10 a vacuum clamping system in accordance with the invention. As mentioned above, the system 10 is adapted for trimming a sheet-like workpiece 12, and is particularly well suited for trimming sheets of composite material.

The workpiece 12 is positioned on a supporting frame 14 having upwardly-projecting pins 16 that are in registration with edge openings 18 in the workpiece. A template 20 is placed or laid flatly across the top surface 22 of the workpiece 12. The template's perimeter 24 provides a guide for subsequently trimming the workpiece 12, to form a part having the outline of dashed lines 26. Naturally, a differently-shaped template 20 would provide a different part outline.

It should be appreciated at this point that some templates may be flat, while others may be gently curved depending on the configuration of the workpiece 12, and the part which is to be made as a result of trimming the workpiece. Also, in some manufacturing environments, a given template may be positioned relative to the workpiece by having pins that are brought into registration with openings in the workpiece. In such case, the position of the openings are selected so as to conform to the position of plate pins, Although this type of arrangement is common in the making of composite parts, and has been used in combination with "C" clamps as described above, it is not particularly germane to the invention sought to be patented here. For such reason, it need not be described in further detail.

The template 20 has a plurality of circular openings 28 extending through its thickness. Positioned above the template 20 and workpiece 12 is a vacuum manifold 30 from which are suspended a plurality of hold-down pods 32. Each hold-down pod 32 is suspended by an extendible vacuum hose 34, or the like, through which a vacuum is drawn.

Figure 2:
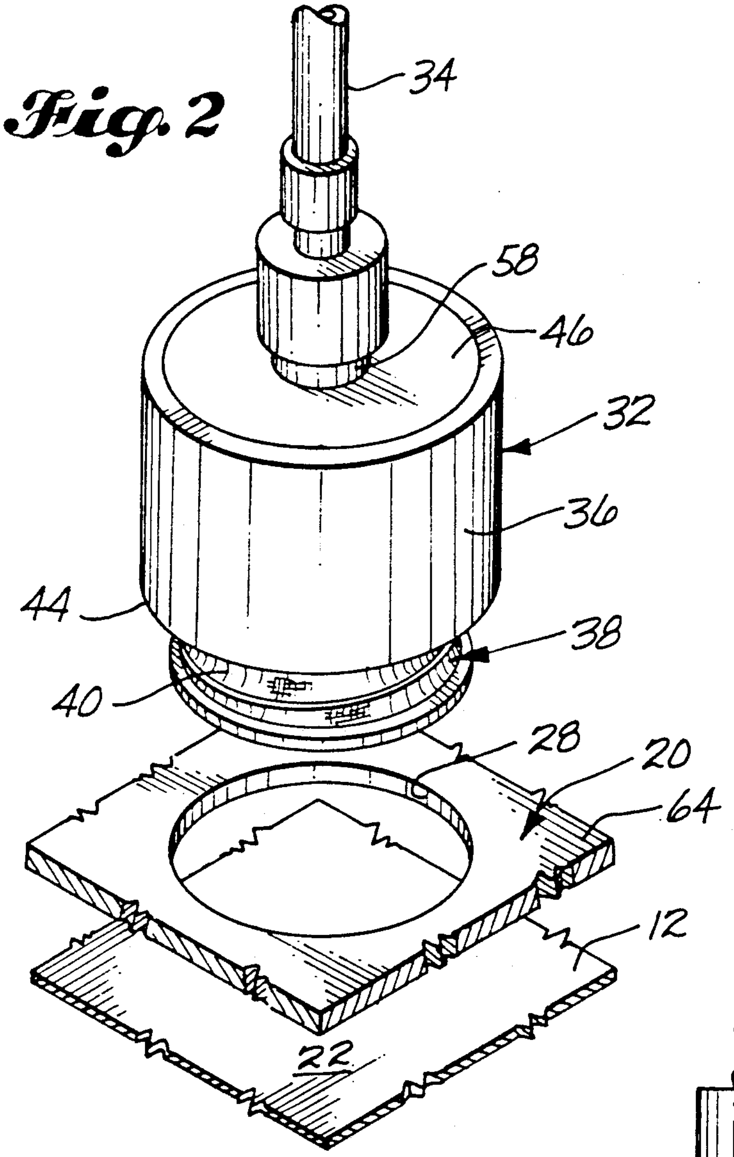
FIG. 2 is an enlarged pictorial view of one hold-down pod in accordance with the invention, and includes a fragmentary view of a portion of both the template and underlying workpiece shown in FIG. 1.
Figure 3:
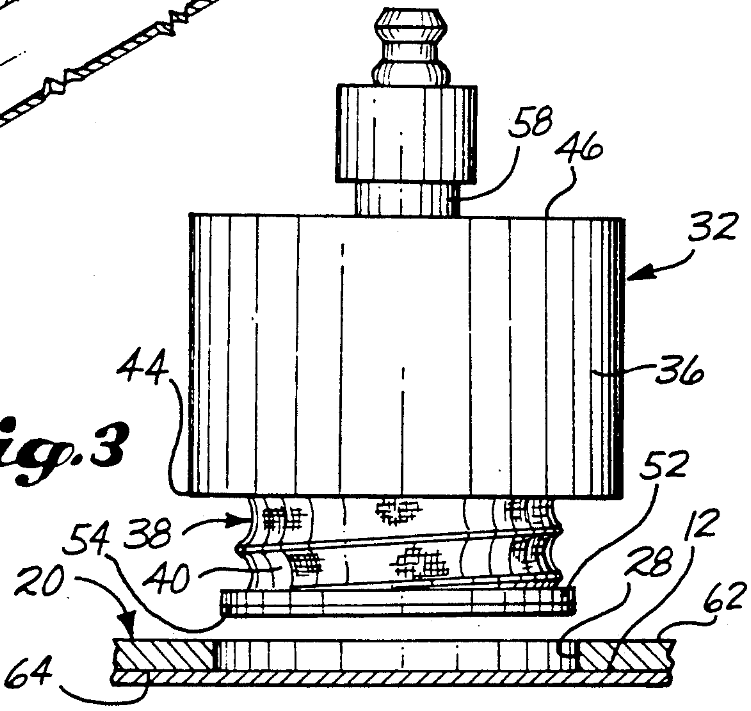
FIG. 3 is a side view of the hold-down pod shown in FIG. 2.

Referring now to FIGS. 2 and 3, each vacuum pod 32 includes a cylindrical housing 36 and a bellows 38. The bellows 28 is generally cylindrical in shape, and is made from an airtight fabric such as rubberized canvas. Its wall 40 has a ribbed outline resulting from a helical spring 42 that structurally supports the bellows fabric 40 (see FIGS. 4 and 5). The spring 42 enables the bellows 38 to flexibly expand or contract. Normally, the spring 42 maintains the bellows 38 in the expanded condition shown in FIGS. 3 and 4.

Figure 4:
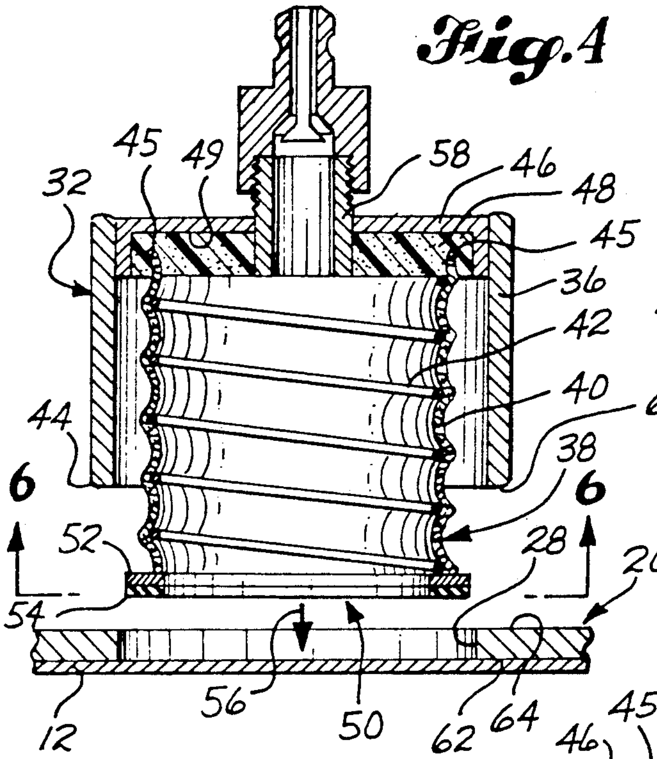
FIG. 4 is a cross-sectional view of the hold-down pod shown in FIG. 3.

As is best seen in FIG. 4, the pod's cylindrical housing 36 has an open end 44, and a closed end 46. One end 45 of the bellows 38 is connected to the closed end 46 of the housing, preferably by being embedded in a resinous bonding material 48 that fills an inner portion of the housing, adjacent the inner surface 49 of closed end 46. The other end of bellows 38, which is indicated generally at 50, is an open, suction end that is circular in shape. Its shape is defined by a metal ring 542 having an annular seal 54 connected to its lower surface.

Referring again to FIG. 1, in operation, after the template 20 has been laid across workpiece 12, depending upon the size of the template, either all or some of the hold-down pods 32 are brought down adjacent the template's openings 28. Preferably, a sufficient number of pods 32 are suspended from manifold 30 such that one hold-down pod is available for each template opening. p The suction end 50 of each bellows 38 is extended downwardly through a separate template opening, as indicated by arrow 56 in FIG. 4, until the suction end 50 contacts and is closed by the upper surface 22 of the workpiece 12. As is shown in FIG. 4, the bellows 38 is in an expanded or lengthened condition during such movement.

Figure 5:
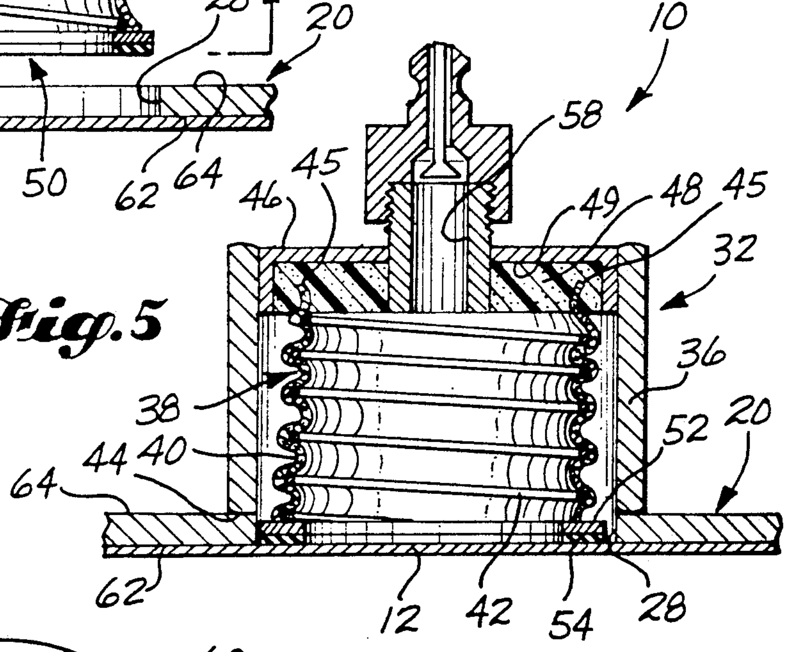
FIG. 5 is a view like FIG. 6, but shows the hold-down pod clamping the template to the workpiece.

Each pod 32 has a vacuum orifice 58 that provides an airflow passageway between the inside of bellows 38 and the vacuum source that is provided via hose 34. Once the suction end 50 of the bellows 38 has contacted the workpiece, and has been closed thereby, evacuation of the bellows is begun. The airtight seal provided by annular seal 54 causes the bellows 38 to contract as the air pressure inside of the bellows reduces, and the bellows consequently shortens its length opposing the force of spring 42. This pulls the pod's housing 36 downwardly against the template as shown in FIG. 5.

Figure 6:
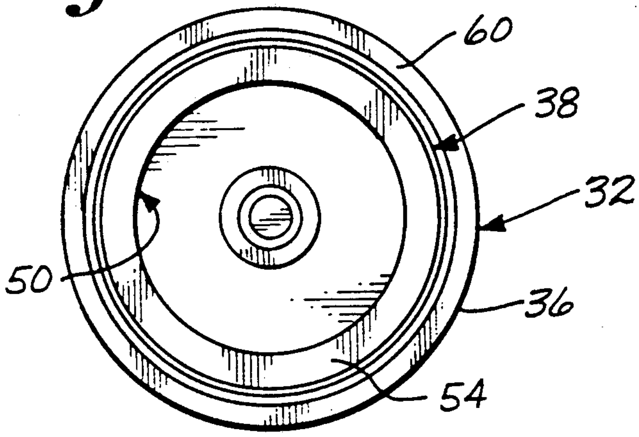
FIG. 6 is a bottom view of the hold-down pod shown in FIGS. 2-5, and is taken looking upwardly along line 6—6 in FIG. 4.

The housing's open end 44 provides an annularly-shaped thrusting surface 60 (see FIG. 6) which presses against the template around opening 28. The bellows 38 pulls the workpiece 20 against one side 62 of the template 20, and correspondingly pulls the housing 36 against the opposite side 64, thus sandwiching the template in between the workpiece and hold-down pod 32 (see FIg. 5). It is preferred that the outer diameter of the bellows 28, and the ring 52 and seal 54, be slightly less than the diameter of any template opening 28. The diameter of thrusting surface 60 should be slightly larger than the diameter of any template opening 28.

Using a plurality of pods 32 in the above-described manner ensures that the template 20 will be held fixedly adjacent the workpiece during a subsequent trimming and/or routing operation. As the skilled person would appreciate, the template openings 28 and hold-down pods 32 are positioned sufficiently inwardly from the template's perimeter 24 so that no hold-down pods will interfere with the movement of a router going around the entire perimeter of the template. The number of pods 32 placed into use in a given clamping operation will vary depending on the size and boundary outline of the template 20.

After trimming the workpiece 12, the pods 32 are removed from the part and template by releasing the vacuum inside each pod's bellows 38. This permits each bellows 38 to once again expand to the position shown in FIGS. 3 and 4, which is caused by the normal spring force of helical spring 42.

Having thus described a preferred embodiment for carrying out a vacuum clamping system in accordance with the invention, it is to be understood that the above description is not to be taken in a limiting sense, and that it is possible certain changes could be made to the clamping system described above without departing from what is considered to be the spirit and scope of the invention. Instead, what is considered to be the invention is set forth in the subjoined patent claims, and the preceding description is to be used to give life and meaning to such claims, in accordance with the well-established doctrines of patent claim interpretation.

What is claimed is:

1. A vacuum clamping system for trimming a workpiece, comprising:

a template adapted to be laid across one side surface of said workpiece, said template being shaped to outline at least a portion of said workpiece to be trimmed, and having a plurality of openings through its thickness;

a plurality of hold-down pods, each pod including an expandable and contractible bellows, said bellows having an open suction end that is sized and shaped to pass through any one of said template openings, for coming into closing contact with said one side surface of said workpiece, said bellows being connected to a vacuum source, for drawing air from inside said bellows and thereby causing said bellows to contract when said suction end is closed, with each hold-down pod further including a clamping housing, connected to said bellows, and adapted to thrust against said template in response to contraction of said bellows, whereby in operation, at least some of said hold-down pods are placed adjacent said template while said bellows of each one of said pods is in an expanded condition, in a manner so that the suction end of said bellows extends through a separate one of said template openings and into closing contact with said workpiece, and upon evacuation of said bellows, the resultant contraction of said bellows causing said clamping housing of each one of said pods to be pulled into thrusting contact with said template, thereby sandwiching said template between said workpiece and said hold-down pods, in a manner so as to hold said template in a fixed position relative to said workpiece.

2. The vacuum clamping system of claim 1, wherein said clamping housing of each hold-down pod is cylindrically shaped and hollow, and has an open end that defines an annularly-shaped thrusting surface, for pressing against said template, and wherein a portion of said bellows is received within said housing, said suction end of said bellows normally extending out of said housing past said annularly-shaped surface, said annularly-shaped surface surrounding said bellows, and having a diameter that is larger than the diameter of any one of said openings through the thickness of said template.

3. The vacuum clamping system of claim 2, wherein said clamping housing also has a closed end, and further, said bellows is made of an airtight fabric having a ribbed, cylindrical shape whose wall outline is defined by a helical spring, with one end of said bellows being closed, and connected to said housing's closed end, and the other end of said bellows being open and defining said suction end.

4. The vacuum clamping system of claim 3, wherein said clamping housing further includes a vacuum orifice defining an airflow pathway through said closed end of said clamping housing, said orifice providing an airlfow path between said vacuum source and inside said bellows.

5. The vacuum clamping system of claim 3, wherein said one end of said bellows is closed by and connected to said housing's closed end by a resinous bonding material, said bonding material filling an inner portion of said housing.

6. The vacuum clamping system of claim 5, wherein said clamping housing further includes a vacuum orifice defining an airflow pathway through both said closed end of said clamping housing and said resinous bonding material, said orifice providing an airlfow path between said vacuum source and inside said bellows.

7. The vacuum clamping system of claim 3, wherein said suction end of said bellows includes a circular ring member that defines the shape of said suction end, and an annular seal connected to said ring member, for providing a substantially airtight seal between said suction end and said workpiece.

8. The vacuum clamping system of claim 7, wherein said annular seal is made of foam rubber.

9. The vacuum clamping system of claim 7, wherein said annular seal is made of silicon rubber.

10. The vacuum clamping system of claim 3, wherein said suction end of said bellows includes an annular seal shaped to contact said workpiece, and to provide a substantially airtight seal between said suction end and said workpiece.

11. The vacuum clamping system of claim 10, wherein said annular seal is made of foam rubber.

12. The vacuum clamping system of claim 10, wherein said annular seal is made of silicon rubber.

* * * * *

UNITED STATES PATENT AND TRADEMARK OFFICE
CERTIFICATE OF CORRECTION

PATENT NO. : 5,110,239

DATED : May 5, 1992

INVENTOR(S) : A. Douglass Riley, et al

It is certified that error appears in the above-identified patent and that said Letters Patent is hereby corrected as shown below:

Column 1, line 10, after "templates", insert -- as trimming guides, and to methods for holding a template --.

Column 2, line 2, "al" should be -- all --.

Column 2, line 51, "walls" should be -- wall --.

Column 3, line 34, "workpiece, and" should be -- workpiece; and --.

Column 3, line 65, "pin, Although" should be -- pins. Although --.

Column 4, line 12, "bellows 28" should be -- bellows 38 --.

Column 4, line 28, "ring 542" should be -- ring 52 --.

Column 4, line 37, delete "p", and begin a new paragraph.

column 5, line 49, "whereby" should be -- and --.

column 6, line 27, "airlfow" should be -- airflow --.

column 6, line 39, "airlfow" should be -- airflow --.

column 6, line 50, "silicon" should be -- silicone --.

column 6, line 59, "silicon" should be -- silicone --.

Signed and Sealed this

Tenth Day of August, 1993

Attest:

Michael K. Kirk

MICHAEL K. KIRK

Attesting Officer

Acting Commissioner of Patents and Trademarks